Figure 1:
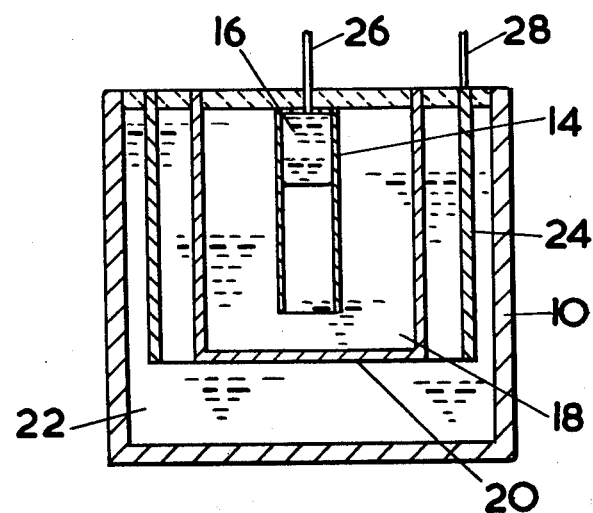

United States Patent [19]

Cleaver et al.

[11] 4,015,054

[45] Mar. 29, 1977

[54] ELECTROLYTIC CELLS

[75] Inventors: Brian Cleaver, Eastleigh; Geoffrey John Rowlands, Chelmsford, both of England

[73] Assignee: National Research Development Corporation, London, England

[22] Filed: Aug. 18, 1975

[21] Appl. No.: 605,325

[52] U.S. Cl. .............................. 429/104; 429/191; 429/218
[51] Int. Cl.² .................................. H01M 43/00
[58] Field of Search ............... 136/83 T, 90, 6 LF, 136/6 FS, 6 F, 20, 153, 83 R, 100 R; 429/104, 118, 191

[56] References Cited
UNITED STATES PATENTS

| | | |
|---|---|---|
| 3,554,806 | 1/1971 | Greenberg et al. ............ 136/83 T |
| 3,841,912 | 10/1974 | Kagawa et al. ................ 136/6 FS |
| 3,852,114 | 12/1974 | Dubin ............................ 136/83 T |
| 3,887,396 | 6/1975 | Walsh et al. .................... 136/6 L |
| 3,904,435 | 9/1975 | Benderly ........................ 136/90 |
| 3,933,521 | 1/1976 | Vissers et al. ................. 136/6 LF |

*Primary Examiner*—Anthony Skapars
*Attorney, Agent, or Firm*—Cushman, Darby & Cushman

[57] ABSTRACT

A lithium/chalcogen thermal cell having a ceramic electrolyte and a lithium ion-containing salt intermediate the anode and the electrolyte. The chalcogen is preferably selenium or sulphur and the ceramic electrolyte is preferably βalumina, or β″alumina, or Li₄SiO₄, or Li₄TiO₄. Contact between the anode and the electrolyte is prevented by the intermediate salt and the ceramic electrolyte prevents self discharge of the cell resulting from dissolution of the electrode materials.

11 Claims, 2 Drawing Figures

ELECTROLYTIC CELLS

This invention relates to electrolytic cells of the kind comprising an alkali-metal anode and a chalcogen cathode. Such cells can be used as primary cells, but the principal advantage lies in their utility as secondary cells.

It has been proposed to construct a cell of the kind set forth comprising a sodium anode and a sulpher cathode separated by an electrolyte which is β-alumina. It has been suggested that the life of the β-alumina is limited by contact with metal sodium and that formation of sodium sulphide in the cathode on discharge causes a large increase in cathode volume risking fracture or breakage of the electrolyte.

It has also been proposed to construct a cell comprising a lithium or lithium alloy anode and a sulphur cathode separated by a liquid electrolyte. The electrolyte is a fused salt containing lithium ions and this is partially immobilised by admixture of an inert, solid filler or by holding it in a felt or cloth made from an inert material. The prime disadvantage of this known cell is that solution of the electrode materials causes self discharge, considerably reducing both the operating life and the efficiency of the cell.

According to the present invention an electrolytic cell comprises a lithium or lithium alloy anode, an electrolyte comprising a lithium conducting ceramic, a cathode comprising a chalcogen, and a salt containing lithium ions interposed between the anode and the electrolyte. Conveniently the chalcogen is selenium, although preferably the chalcogen is sulphur.

In one embodiment of the invention the anode comprises lithium. Alternatively the anode may comprise lithium held in the cells of a reticulated metal foam. As a further alternative the anode may comprise an alloy of aluminium and lithium. As a still further alternative the anode comprises a molten alloy of sodium and lithium; in this case the salt contains both sodium and lithium ions.

Optionally the salt containing lithium ions may be immobilised in an inert filler. An example of a suitable filler is calcium zirconate. The ceramic electrolyte preferably comprises sodium oxide and alumina in substantially stoichiometric proportions corresponding to β-alumina ($Na_2O.11Al_2O_3$) or to β''-alumina (approximately $Na_2O.5-3Al_2O_3$). Other suitable lithium conducting ceramics are $Li_4SiO_4$ and $Li_4TiO_4$.

In operation an electrolytic cell in accordance with the invention is heated to temperatures typically between 280° C and 400° C and the lithium ion containing salt separating the anode from the electrolyte becomes molten allowing transport of lithium ions through it.

One advantage of the cell of the present invention is that it has a solid impermiable ceramic electrolyte so avoiding self discharge from dissolution of the electrode materials in the electrolyte. Another advantage is that contact between the liquid alkali metal and the ceramic is prevented so avoiding degradation of the latter.

A further advantage of the invention over the known sodium-sulphur cell is that the change in the cathode volume upon the discharge of the cell is very much reduced thus reducing the engineering problems associated with such cells. Furthermore lithium is much lighter than sodium thus enabling lower weight cells.

Figure 2:
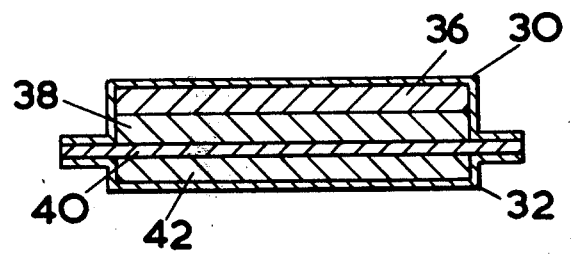

In order that the invention might be more fully understood and further features appreciated, the following description, which is by way of example only, refers to the drawings accompanying the provisional specification in which:

FIG. 1 illustrate in vertical section a simple secondary cell in accordance with the invention, and FIG. 2 is a vertical section of a single cell of a multicell battery according to the invention.

In FIG. 1 an electrolytic cell in accordance with the invention comprises an inert pot 10 whose open end is closed by a lid 12. The lid 12 maintains an inverted closed ended tube 14, suspended in a lithium ion containing salt 18. The salt 18 may conveniently be a mixture of alkali halides such as LiCl – LiI – Ki. The closed end of the inverted tube 14 maintains a volume of lithium 16 as an anode above the salt 18. A container comprising β-alumina holds the lithium containing salt 18 and forms the electrolyte 20. The volume between the electrolyte 20 and the inner wall and base of the pot 10 is filled with sulphur 22 as the cathode.

The pot 10, the lid 12, and the inverted tube 14 are manufactured of materials inert to sulphur and lithium. Refractory metals and stainless steel are examples of materials suitable for the pot 10 and the inverted tube 14, whereas an inert ceramic material would be suitable for the lid 12. The cathode current collector comprises a cylinder of carbon felt 24 suspended in sulphur 22. Leads 26 and 28 pass through the lid 12 to provide current connects to the inverted tube 14 and the carbon felt 24. The outside of the tube 14 may be coated with an insulating material such as alumina to prevent lithium collecting against this surface during the recharging process. Thus lithium generated during recharging process will only collect at the anode 16.

Before operation the cell is heated to a temperature of the order of 350° C by, for example, electric radiant heating. This renders the anode 16, the lithium ion containing salt 18, and the sulphur 22 liquid. With modern heat insulating materials it should be possible to ensure that these materials remain liquid during the life of the cell while not in use, once the initial operating temperature has been reached.

It will be appreciated that the cell as described with reference to FIG. 1 has the disadvantage that it can be operated in the upright condition only, as the lithium would escape from the inverted tube in any other position. To overcome this problem the salt may be immobilised in an inert filler as previously mentioned trapping the lithium, alternatively the lithium may be manufactured in a reticulated metal foam or felt. As an alternative to a lithium anode, a lithium sodium alloy may be used as an anode. In this case the salt may preferably be an eutectic of sodium and lithium halides.

The arrangement of FIG. 1 is not suitable for high power operation for which a multicell arrangement is desirable. The construction shown in FIG. 2 illustrates a single cell of a multicell battery. In FIG. 2 a single cell comprises anode 36 being comprised of lithium aluminium alloy separated from the cathode 42 by a disc of β-alumina 40. The cathode 42 comprises a disc of sulphur impregnated carbon felt. As will be seen in FIG. 2 the disc of β-alumina 40 is of greater diameter than either the anode 36 or the cathode 42 and acts effectively as a gasket between the flanged end pieces 30 and 32 covering the anode and cathode respectively. In the cell direct contact between the anode 36 and the β-alumina disc 40 is prevented by the interposition of a layer of a lithium containing salt 38, conveniently a mixture of alkali halides such as LiCl — LiI – KI, immobilised in an inert filler such as calcium zirconate.

Again this cell requires heating before use to render the salt and the sulphur liquid.

We claim:
1. An electrolyte cell comprising:
   a. an anode formed of a material including lithium,
   b. a ceramic electrolyte selected from the group consisting of $\beta$ alumina and $\beta''$ alumina,
   c. a cathode containing a chalcogen, and
   d. a salt containing lithium ions which salt is interposed between the anode and the electrolyte.
2. An electrolytic cell as claimed in claim 1 in which the chalcogen is selected from the group consisting of selenium and sulphur.
3. An electrolytic cell as claimed in claim 1 in which the anode comprises a reticulated metal foam, said lithium being held in the cells of said reticulated metal foam.
4. An electrolytic cell as claimed in claim 1 in which the lithium containing anode comprises an alloy of lithium and sodium.
5. An electrolytic cell as claimed in claim 1 including an inert filler in which said salt is immobilised.
6. An electrolytic cell as claimed in claim 4 in which the said salt contains lithium and sodium ions.
7. An electrolyte cell as claimed in claim 1 in which the anode comprises an alloy of lithium and aluminum.
8. An electrolytic cell comprising:
   a. an inert pot which encloses the cell,
   b. a chalcogen cathode,
   c. a cylinder of carbon felt suspended in the cathode material and forming the current collector therefor,
   d. an electrolyte comprising a pot of lithium-conducting ceramic material suspended within the cathode material,
   e. a lithium ion-containing salt contained within the electrolyte pot,
   f. an inert tube having an open end and a closed end, said tube being suspended within the lithium ion-containing salt with its open end lowermost,
   g. a lithium anode which is contained at the closed end of the inert tube, and,
   h. a lid closing said inert pot and from which said carbon felt cylinder, said ceramic pot, and said inert tube are suspended in their respective positions within said inert pot.
9. The electrolytic cell of claim 8, wherein said electrolyte is $\beta$ alumina or $\beta''$ alumina.
10. A multicell battery in which cell comprises
    a. a first, and a second, conductive, flanged end piece,
    b. a lithium-aluminum alloy anode contained in the first end piece,
    c. a plate of lithium-conducting ceramic forming the electrolyte,
    d. a layer of lithium ion-containing salt immobilised in an inert filler and contained in the first end piece, and,
    e. a sulphur impregnated, carbon felt cathode contained in the second end piece; said ceramic electrolyte being interposed between said end pieces to prevent contact between the flanges thereof, and said layer of lithium ion-containing salt being interposed between said anode and said ceramic electrolyte to prevent contact thereof.
11. The multicell battery of claim 10, wherein said electrolyte is $\beta$ alumina or $\beta''$ alumina.

* * * * *